United States Patent [19]

Salter, Jr. et al.

[11] 4,455,856

[45] Jun. 26, 1984

[54] COOLANT SEAL FOR ROLLING MILL OIL FILM BEARING

[75] Inventors: Lowell S. Salter, Jr., Shrewsbury; Ralph F. Divirgilio, Holden; Russell A. Brickey, Princeton, all of Mass.

[73] Assignee: Morgan Construction Company, Worcester, Mass.

[21] Appl. No.: 481,753

[22] Filed: Apr. 4, 1983

[51] Int. Cl.³ .................... B21B 27/06; F16J 15/54
[52] U.S. Cl. ................................. 72/236; 277/152; 277/166
[58] Field of Search ............... 72/236, 237, 247; 277/152, 166, 178, 186, 180, 189; 384/138, 147, 148

[56] References Cited

U.S. PATENT DOCUMENTS

| 2,868,574 | 1/1959 | Rich | 277/152 |
|---|---|---|---|
| 3,588,129 | 6/1971 | Pitner | 277/189 |
| 4,165,881 | 8/1979 | Salter | 277/152 |
| 4,234,196 | 11/1980 | Iida | 277/152 |
| 4,389,053 | 6/1983 | Innis | 277/152 |

Primary Examiner—Lowell A. Larson
Assistant Examiner—Jorji M. Griffin
Attorney, Agent, or Firm—Thompson, Birch, Gauthier and Samuels

[57] ABSTRACT

A coolant seal for use in a rolling mill wherein the neck of a roll is rotatably supported in an oil film bearing contained within a bearing chock, with a seal assembly located between the roll end face and the bearing chock to retain oil in the bearing and to exclude contaminants such as cooling water, mill scale, etc. from the bearing. The seal assembly includes a circular seal end plate fixed relative to the bearing chock at a location surrounding a circular flanged seal mounted on the roll neck for rotation therewith. The coolant seal is circular, with a radially disposed mounting flange integrally joined at its inner edge to a sealing flange extending angularly and flexibly therefrom. The mounting flange is secured to a mounting surface on the seal end plate at a location placing the sealing flange in frictional contact with the roll end face. The mounting flange is provided with an integral bumper protruding axially therefrom in one direction towards the roll end face, and an integral positioning shoulder protruding axially therefrom in the opposite direction in a recess in the mounting surface of the seal end plate.

10 Claims, 7 Drawing Figures

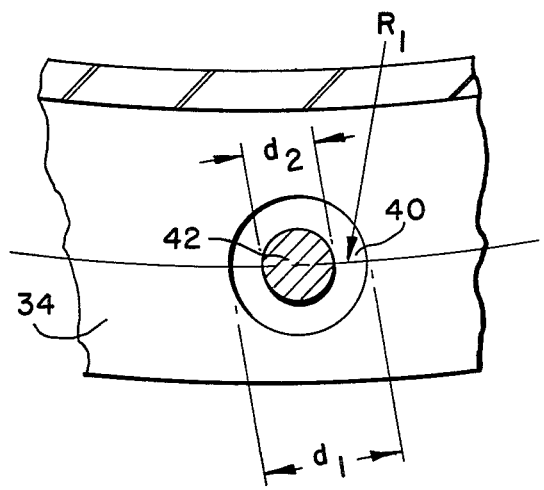
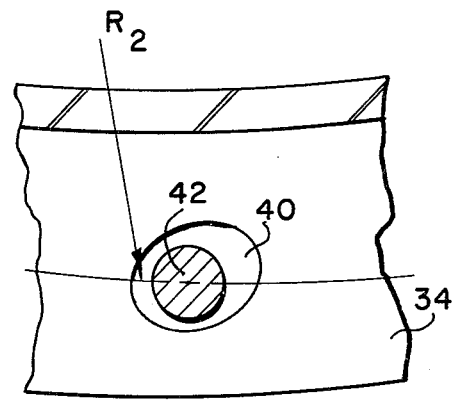
Fig. 2A (Prior Art)
Fig. 2B (Prior Art)
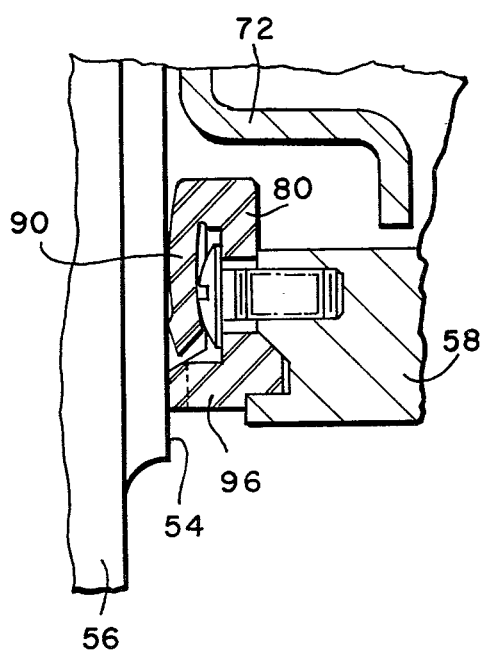
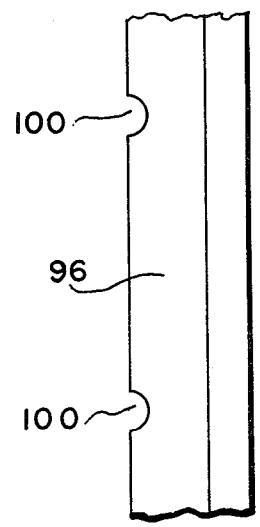
Fig. 4
Fig. 6

COOLANT SEAL FOR ROLLING MILL OIL FILM BEARING

BACKGROUND OF THE INVENTION

1. Field of Invention

This invention relates to an improved water guard for a seal assembly of the type employed with oil film bearings in rolling mills.

2. Description of the Prior Art

A previously developed sealing arrangement for a rolling mill oil film bearing is shown in FIG. 1. In that arrangement, the roll 10 has an end face 12 joined by an intermediate tapered section 14 to a reduced diameter section 16 surrounded by a sleeve 18. The sleeve is keyed or otherwise secured to the roll neck, and is journalled in a bushing 20 fixed within a roll chock 22. Oil is supplied continuously at the bearing interface between the sleeve and bushing, and the seal assembly generally indicated at 24 surrounds the intermediate tapered neck section 14 to prevent oil from escaping from the bearing and also to prevent contaminants such as cooling water, mill scale, etc. from penetrating into the bearing.

The seal assembly includes a circular flexible flanged neck seal 26 and a flinger ring 28, both being carried on the roll for rotation therewith, and a seal end plate 30 and a coolant seal 32, all being fixed in relation to the bearing chock 22.

The coolant seal 32 has a radial mounting flange 34 integrally joined at its inner periphery as at 36 to a sealing flange 38 extending angularly therefrom into sealing contact with the roll end face 12. The mounting flange has holes 40 through which protrude screws 42 which are threaded into the seal end plate 30. The seal end plate has an integral circular shoulder 44 which protrudes axially towards the roll end face 12, and which acts as a bumper against which the roll end face may bear during an extreme axial "floating" of the roll in relation to the chock. While this arrangement has the capability of operating in a generally satisfactory manner, it does embody several drawbacks. For example, the shoulder 44 can be damaged by contact with the rotating roll end face 12, and this can eventually lead to a need to replace the seal end plate 30 at a considerable cost to the mill owner. Also, because the shoulder 44 protrudes axially beyond the end of the seal end plate flange 46, the overall axial length of the seal end plate coating is unnecessarily increased, resulting in a concomitant increase in its weight and cost.

As best can be seen by additionally referring to FIG. 2A, a further drawback stems from the fact that the diameters $d_1$ of the holes 40 in the mounting flange 34 preferably should be considerably larger than the diameters $d_2$ of the screws 42, so as to allow for some relative shifting or "play" between the mounting flange and the screws. Thus, when a given sized coolant seal is mounted on a seal end plate having a given radius $R_1$, the screws 42 may be centrally located in their respective holes 40. However, as shown in FIG. 2B, in the event that the same sized coolant seal is used in a smaller bearing assembly where the seal end plate has a smaller radius $R_2$, then a relative shifting and distortion of the mounting flange 34 and its respective holes 40 will occur relative to the screws 42 as a result of the coolant seal being bent into a smaller circle. Because of this shifting and distortion, the screws 42 cannot be relied upon to accurately control the spacing 48 between the inner periphery of the coolant seal and the cylindrical surface 50 of the flinger ring 28. If this spacing is not adequate, the coolant seal and/or the flinger ring will wear prematurely.

SUMMARY OF THE PRESENT INVENTION

The present invention obviates the above-mentioned problems by providing the coolant seal mounting flange with an integral circular bumper shoulder protruding axially towards the roll end face, and with another integral circular positioning shoulder protruding axially in the opposite direction into a recess in a mounting surface of the seal end plate. The bumper shoulder replaces the conventional shoulder of the seal end plate. Thus, the seal end plate is safeguarded from coming into damaging contact with the roll end face, and in addition its axial length is shortened, which translates into a savings in its weight and cost. Since the coolant seal is a relatively low cost and easily replaceable item, wear of its bumper shoulder occasioned by contact with the roll end face is of no major consequence.

The oppositely protruding positioning shoulder cooperates with the recess in the mounting surface of the seal end plate to provide an accurate means of locating the inner periphery of the coolant seal regardless of the relative position of the mounting screws in their respective holes in the mounting flange. Thus, premature wear of the coolant seal and/or flinger ring is avoided without sacrificing the advantage of having one coolant seal which is adaptable to a number of different diameter bearings.

These and other objects and advantages of the present invention will become more apparent as the description proceeds with the aid of the accompanying drawings wherein:

BRIEF DESCRIPTION OF THE DRAWINGS

FIGS. 2A and 2B are partial sectional views taken along line 2—2 of FIG. 1 showing the application of the same coolant seal to different sized seal end plates;

FIG. 4 is an enlarged view showing the condition of the coolant seal when its bumper shoulder is contacted by the roll end face;

FIG. 6 is a partial bottom plan view of the coolant seal.

DETAILED DESCRIPTION OF PREFERRED EMBODIMENT

Figure 3:
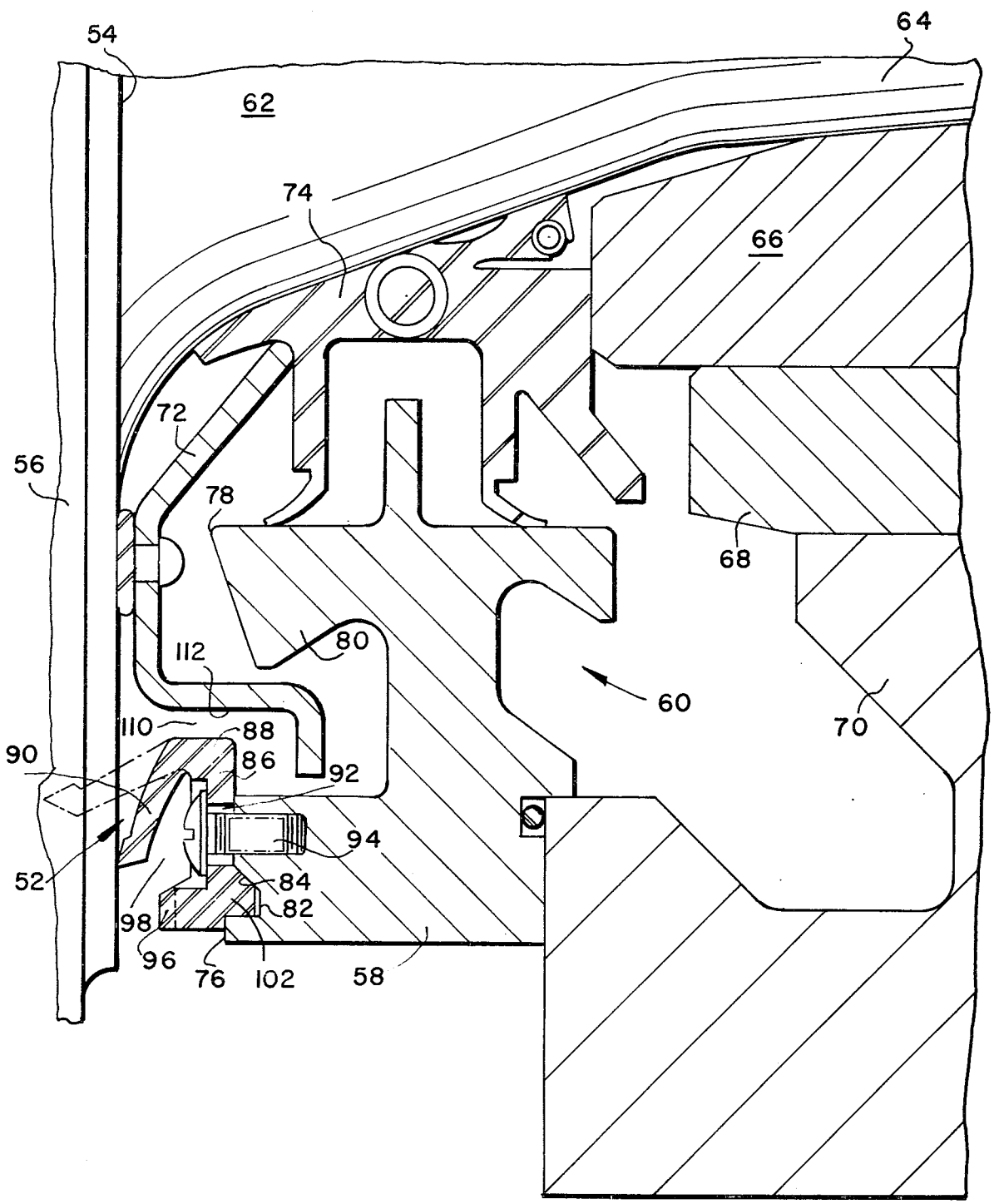
FIG. 3 is a partial view in cross section of a rolling mill oil film bearing incorporating the coolant seal of the present invention.

Referring now to FIG. 3, the improved coolant seal of the present invention is shown at 52 between the end face 54 of a roll 56 and a seal end plate 58 of a seal assembly generally indicated at 60. As in the previously developed arrangement shown in FIG. 1, the roll has a tapered intermediate section 62 leading to a reduced diameter section 64 surrounded by a sleeve 66, the latter being journalled for rotation in a bushing 68 contained in a bearing chock 70. Lubricating oil is again supplied continuously between the bearing interface of the sleeve 66 and bushing 68 during operation of the mill. In addition to the seal end plate 58 and water guard 52, the seal assembly 60 again includes a flinger ring 72 and a circular resilient flanged neck seal 74, both of which rotate with the roll 56.

The seal end plate 58 has a radial mounting surface 76 which is located axially within the plane of the tip 78 of shoulder 80. The mounting surface is provided with a circular recess 82 having a conical contact face 84.

Figure 5:
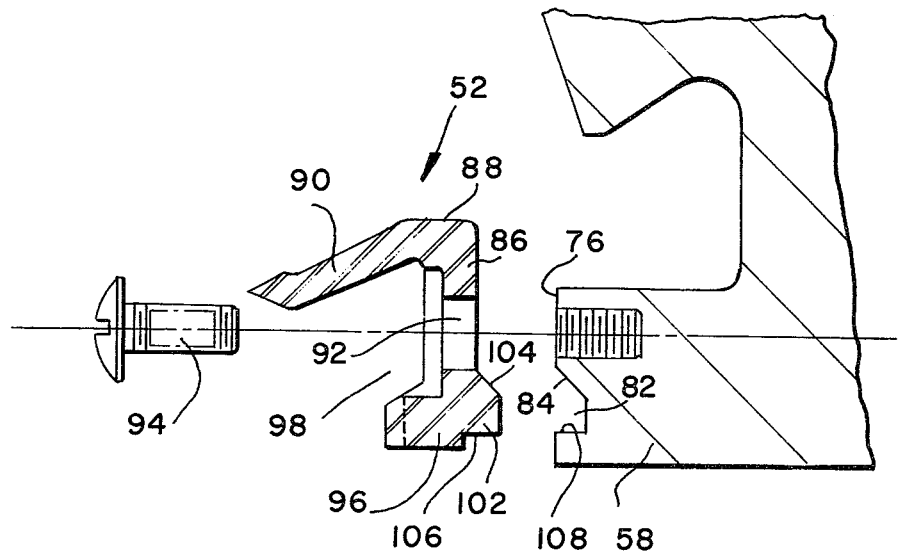
FIG. 5 is an exploded cross sectional view of the coolant seal and seal end plate.

With additional reference to FIGS. 4-6, it will be seen that the coolant seal 52 has a radially disposed mounting flange 86 integrally joined at its inner edge 88 to a sealing flange 90 extending angularly and flexibly therefrom. The mounting flange 86 has a series of holes 92 through which extend mounting screws 94 threaded into circumferentially spaced holes in the seal end plate mounting surface 76.

Figure 1:
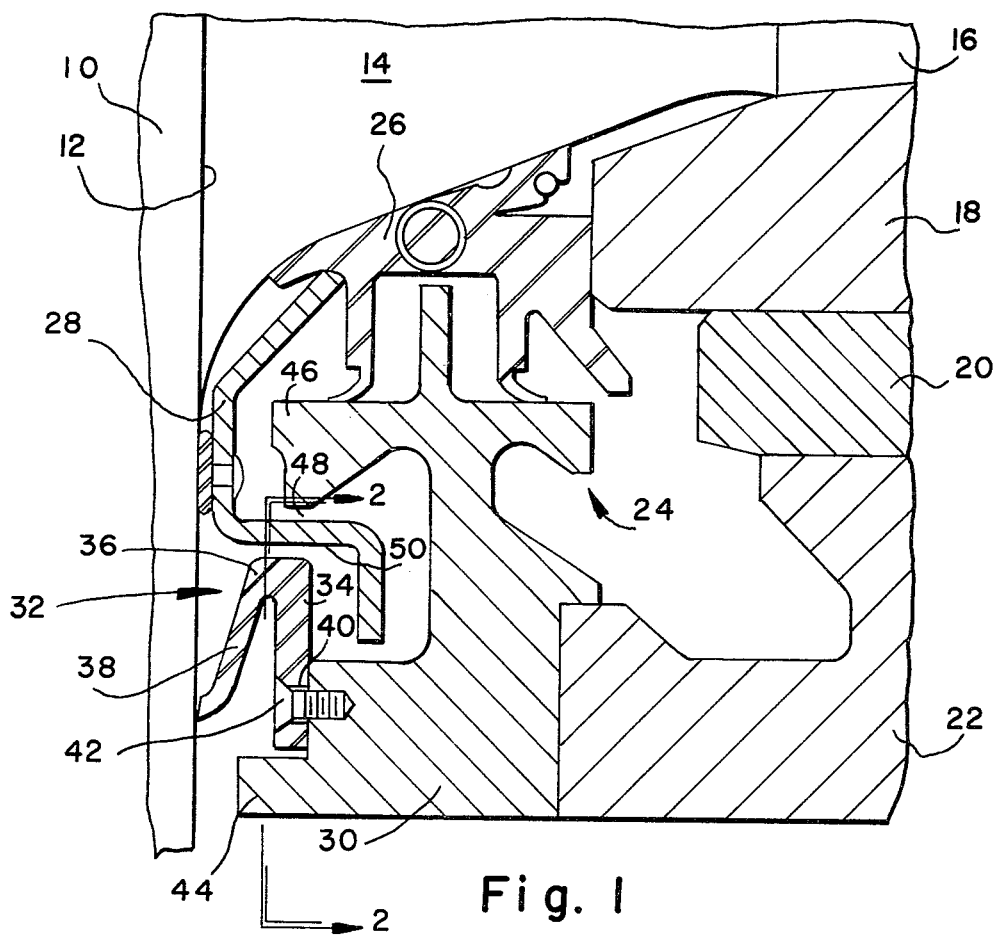
FIG. 1 is a partial view in cross section of a rolling mill oil film bearing assembly incorporating a previously developed sealing arrangement and coolant seal.

For the reasons discussed in connection with the description of the previously developed version shown in FIGS. 1-2B, the diameters of the holes 92 again are greater than the diameters of the screws 94.

The mounting flange 86 has an integral circular bumper shoulder 96 protruding axially therefrom towards the roll end face 54. The bumper shoulder 96 extends axially outwardly beyond the tip 78 of the seal end plate shoulder 80, and it cooperates with the mounting flange 86 in defining an open recess 98. In the event that the roll 56 floats axially towards the chock 70, the seal assembly components and internal bearing components will be safeguarded from damage by the bumper shoulder 96 which will be engaged by the roll end face 54 and thereby act as a stop. This engagement is illustrated in FIG. 4. As this occurs the sealing flange 90 will be flexibly pressed by the roll end face into the recess 98, the latter being adequately dimensioned to safely receive the flange 90.

As a result of its being contacted by the rotating roll end face 54, the bumper shoulder 96 will experience wear, but this is a relatively minor problem as compared to wear of a bumper shoulder on the seal end plate, because the water guard is a comparatively inexpensive component that can be easily replaced. Preferably, as shown in FIG. 6, the bumper shoulder will be relieved at spaced locations as at 100 to thereby provide a visual means of readily observing the extent of shoulder wear. This will assist mill maintenance personnel in recognizing bearing axial positioning problems.

The mounting flange 86 is additionally provided with an integral circular positioning shoulder 102 which protrudes axially in a direction opposite to that of the bumper shoulder 96. The positioning shoulder is received in the recess 82 in the seal end plate mounting surface 76. The shoulder 102 has a conical surface 104 which slidably engages the mating conical surface 84 of the recess 82. As the mounting screws 94 are tightened and the mounting flange 86 is drawn up against the seal end plate mounting surface 76, the conical surfaces 84, 104 cooperate in radially seating the outer cylindrical surface 106 of the positioning shoulder 102 against the inner cylindrical surface 108 of the recess 82, thereby achieving the precise positioning required to provide the desired radial spacing 110 (see FIG. 3) between the coolant seal and the cylindrical surface 112 of the flinger ring 72. In other words, the positioning shoulder 102 cooperates with the recess 82 in radially locating the mounting flange 86 on the mounting surface 76, and this occurs regardless of the positional relationship of the mounting screws 94 in their respective holes 92 in the mounting flange 86. The multisurface contact between the coolant seal and the seal end plate surfaces 76, 84 and 108 is made possible by the elastomeric qualities of the coolant seal.

It is considered within the scope of our invention to substitute differently shaped axial protuberances for the circular shoulders 96, 102 herein disclosed. The shapes and angular relationships of the mounting and sealing flanges also may be varied. It is our intention to cover these and any other changes to and modifications of the embodiment herein chosen for purposes of disclosure which do not depart from the spirit and scope of the appended claims.

We claim:

1. In a rolling mill wherein the neck of a roll is provided with a sleeve which is rotatably supported in a bushing contained in a bearing chock, with a film of oil being maintained between the sleeve and bushing during operation of the mill, and with a seal assembly located between an end face of the roll and the bearing chock to prevent oil from escaping from the bearing chock while excluding contaminants such as cooling water, mill scale, etc. from entering the bearing chock, the said seal assembly including a circular seal end plate fixed relative to the bearing chock at a location surrounding a circular flexible flanged seal mounted on the roll neck for rotation therewith, said seal end plate having a circular mounting surface spaced axially from the roll end face, the improvement comprising: a circular coolant seal having a radially disposed mounting flange integrally joined at its inner edge to a sealing flange extending angularly and flexibly therefrom, attachment means for detachably securing said mounting flange to said mounting surface at a location placing said sealing flange in frictional contact with the roll end face, said mounting flange being provided with integral bumper means protruding axially therefrom towards the roll end face, said bumper means cooperating with said mounting flange to define a recess into which said sealing flange may be flexibly pressed by the roll end face in the event that said bumper means is engaged by said roll end face.

2. The coolant seal of claim 1 wherein said bumper means comprises a circular shoulder.

3. The coolant seal of claim 2 wherein said circular shoulder is peripherally relieved at spaced locations to provide a means of indicating the extent of shoulder wear.

4. The coolant seal of claim 1 wherein said attachment means comprises a plurality of circumferentially spaced screws which extend through holes in said mounting flange and which are threaded into holes in said mounting surface, the diameters of the holes in said mounting flange being such as to allow for relative lateral movement of said screws therein.

5. The coolant seal of claim 1 wherein said mounting flange is additionally provided with integral positioning means protruding axially therefrom in a direction opposite to that of said bumper means, said mounting surface having a recess arranged to receive and cooperate with said positioning means in radially locating said mounting flange on said mounting surface.

6. The coolant seal of claim 5 wherein said positioning means comprises a circular shoulder.

7. The coolant seal of claim 6 wherein said circular shoulder and said recess in said mounting surface are provided with mutually engageable conical surfaces which cooperate in radially seating an outer cylindrical surface of said shoulder against an inner cylindrical surface of said recess as said mounting flange is secured to said mounting surface by said attachment means.

8. In a rolling mill wherein the neck of a roll is provided with a sleeve which is rotatably supported in a bushing contained in a bearing chock, with a film of oil being maintained between the sleeve and bushing during operation of the mill, and with a seal assembly located between an end face of the roll and the bearing chock to prevent oil from escaping from the bearing chock while excluding contaminants such as cooling water, mill scale, etc. from entering the bearing chock, the said seal assembly including a circular seal end plate fixed relative to the bearing chock at a location surrounding a circular flexible flanged seal mounted on the roll neck for rotation therewith, said seal end plate having a circular mounting surface spaced axially from the roll end face, the improvement comprising: a circular coolant seal having a radially disposed mounting flange integrally joined at its inner edge to a sealing flange extending angularly and flexibly therefrom, attachment means for detachably securing said mounting flange to said mounting surface at a location placing said sealing flange in frictional contact with the roll end face, said attachment means comprising a plurality of circumferentially spaced screws which are threaded into said mounting surface, the diameters of said holes being such as to allow for relative lateral movement of the screws therein, and positioning means integral with and protruding axially from said mounting flange towards said mounting surface, said mounting surface being recessed to receive and cooperate with said positioning means in radially locating said mounting flange on said mounting surface.

9. The coolant seal of claim 8 wherein said positioning means and the recess in said mounting surface are circular.

10. The coolant seal of claim 9 wherein said positioning means and the recess in said mounting surface are provided with mutually engageable conical surfaces which cooperate in radially seating an outer cylindrical surface on said positioning means against an inner cylindrical surface of said recess as said screws are tightened.

* * * * *